United States Patent Office 3,776,868
Patented Dec. 4, 1973

3,776,868
MODIFIED ESTER RESINS
Arthur L. Cunningham, Park Forest, and John Mathai, Chicago, Ill., assignors to The Sherwin-Williams Company, Cleveland, Ohio
No Drawing. Filed May 1, 1972, Ser. No. 249,003
Int. Cl. C08f *19/14*
U.S. Cl. 260—23 EP                               27 Claims

ABSTRACT OF THE DISCLOSURE

This invention relates to resin compositions and to a process for preparing resin compositions which are particularly useful in organic mediums as coating or film-forming materials. The compositions comprise a modified ester obtained by reacting a fatty acid with an epoxidized-fatty acid ester and/or epoxidized-fatty oil to obtain a mixed ester which is modified with an aromatic vinyl monomer.

---

This invention is directed to the preparation of a resin composition and more specifically to a modified-fatty ester composition and to the process of preparing a composition particularly useful in organic mediums as coating or film-forming materials. The composition is obtained by reacting one or more fatty acids, e.g. an unsaturated fatty acid with at least one epoxidized-fatty acid ester and/or epoxidized-fatty oil having an oxirane oxygen content ranging from about 1 to 12% by weight to obtain a mixed ester. The mixed ester is subsequently reacted in the presence of an effective amount of an organic catalyst with an aromatic vinyl monomer to obtain a modified ester resin having from about 10 to 80% by weight of the aromatic monomer.

Various fatty oils such as soybean oil, linseed oil, tung oil, etc. having different degrees of conjugation, unsaturation etc. have been recognized as influencing the properties of coating compositions. Therefore, these oils have been subjected to various treatments including, for example, styrenation. The styrenation of fatty esters and drying oils, for example, has been generally known and has assumed a prominent position in the preparation of coatings, films and the like. However, only a comparative few of these modified oils have produced satisfactory clear films while many have resulted in heterogeneous cloudy or opaque films.

Thus, it has been found in accordance with this invention that a clear homogenous coating or film-forming composition can be obtained, for example, from an organic solution of a modified ester. These film or coating compositions have found widespread use in preparing aerosol coatings, floor sealers, primers and surfacers, air-drying enamels, dipping primers, machinery enamels, paper coatings, traffic paints, furniture sealers, gloss and satin varnishes, drum paints, silk screen inks, aluminum paints and the like.

Accordingly, it is an object of this invention to provide a coating or film-forming composition which may be used in an organic medium to form clear transparent films or coatings. It is another object of this invention to provide a process for preparing film or coating compositions. It is still a further object of this invention to provide a composition which is fast-drying and has excellent film-forming characteristics. These and other objects of this invention will become apparent from a further and more detailed description.

More specifically, the invention relates to a composition which is particularly useful in preparing a coating or film obtained by reacting (a) at least one fatty acid, e.g. an unsaturated fatty acid derived from natural fats or oils with (b) at least one epoxidized fatty acid ester or epoxidized fatty oil having an oxirane oxygen content ranging from about 1 to 12% to obtain a mixed ester composition. The mixed ester is modified by reacting same with an effective amount of at least one aromatic vinyl monomer in the presence of a catalytic amount of an organic peroxide to obtain a modified ester characterized as having from about 10 to 80% by weight and preferably from about 40 to 60% by weight of the aromatic monomer.

In preparing the modified ester compositions of this invention, at least one epoxidized fatty acid ester or epoxidized fatty oil having an oxirane oxygen content ranging from about 1 to 12% and preferably from about 2 to 10% by weight may be used. The preferred epoxy reactants for purposes of this invention include the curable epoxidized esters of fatty acids having up to about 36 aliphatic carbon atoms and preferably from about 6 to 22 carbon atoms in the acid radical and up to about 16 and preferably from about 4 to 12 carbon atoms in the mono- or polyhydric alcohol radical.

The unsaturated esters that may be used in preparing the oxirane-containing fatty acid esters include the natural occurring or synthetically prepared esters of the unsaturated mono-carboxylic acids found in various drying oils or semi-drying oils such as, for example, soybean, safflower, etc. Preferably, the alcohol radical of these unsaturated esters is derived from a polyhydric alcohol having at least three hydroxyl groups in the molecule. The unsaturated esters may comprise a simple polyhydric alcohol, e.g. glycerine or pentaerythritol chemically combined with one or more of the above-mentioned unsaturated fatty acids. The drying oils mentioned hereinabove comprise unsaturated esters which have characteristics of solidifying and hardening when exposed to air. For purposes of this invention, one or more of the natural or synthetic fatty acid esters may be reacted with peracetic acid, for example, in amounts sufficient to obtain an epoxidized fatty acid ester having from about 1 to 12% by weight of an oxirane oxygen content. The epoxidation of synthetic and natural occurring fatty acid esters and fatty oils are well known, and are available in commerce. More specifically, the epoxidized oils and esters may be prepared by various methods including, for example, by the method particularly pointed out in U.S. Pat. 2,569,502.

Specific examples of the various epoxidized fatty acid esters that may be used include epoxidized 2-ethylhexyl tallate, epoxidized 1,5-pentane dioldioleate, epoxidized 1,2,6 - hexane trioldioleate monoacetate, epoxidized methyloleate, epoxidized glycerol trilinoleate, epoxidized glycerol monoleate, epoxidized glycerol monolinoleate, epoxidized glycerol monostearate dilinoleate, epoxidized esters of mono-, di, or poly-penta-erythritol with soy, tall or linseed fatty acids and various mixtures of these esters in any proportions. Various epoxidized esters of different types and oxirane values may be blended together to obtain the desired properties, e.g. improved resistance to coloring, improved drying speed and the like. The oxirane-containing fatty acid esters which may be used for purposes of this invention include the mono-, di-, tri-, tetra-, and penta-hydric alcohol esters of oxirane-containing fatty acids having up to 36 and preferably from 6 to 22 carbon atoms. Esters of fatty acids from monohydric aliphatic alcohols having 1 to 18 carbon atoms and esters from dihydric aliphatic alcohols of 2 to 6 carbon atoms as well as other high molecular weight aliphatic polyhydric alcohols may be used.

The alcohols used to prepare the oxirane-containing fatty acid esters may include, for example, the monohydric alkyl and alkenyl alcohols which provide the alcohol moiety of the esters such as methyl, ethyl, propyl, isopropyl, butyl, isobutyl, amyl, isoamyl, hexyl, heptyl, octyl etc. The dihydric alcohols may include, for example, glycols such as ethylene glycol, propane diol, 1,2-propane diol, dimethyl glycol, trimethylene glycol, pentamethylene glycol hexamethylene glycol, etc. In addition, other polyhydric alcohols used to prepare the oxirane-containing esters include glycerol, erythritol, pentaerythritol, the hexatols, e.g. mannitol, sorbitol, etc. Specific examples of the various epoxy-containing fatty acid esters derived from the aliphatic acids may include, for example, methyl-epoxy stearate, ethyl-epoxy stearate, isopropyl-epoxy stearate, butyl-epoxy stearate, etc.

Specific examples of the fatty oils include epoxidized lard oil, epoxidized peanut oil, epoxidized olive oil, epoxidized safflower oil, epoxidized castor oil, epoxidized neat's-foot oil, epoxidized cotton seed oil, epoxidized corn oil, epoxidized soy bean oil, epoxidized linseed oil, epoxidized perilla oil, epoxidized menhaden oil, etc. These epoxidized oils are readily obtained by reacting the triglyceride, which contains at least one double bond, with a solution of peracetic acid at comparatively low temperatures. During the reaction, the ethylenic groups or double bonds of the triglyceride are converted to epoxy groups without otherwise altering the molecular structure of the glyceride.

The fatty acids to be reacted with the epoxidized esters and oils are either natural or synthetic fatty acids having up to 36 aliphatic carbon atoms and preferably are derived from fats and oils, e.g. drying or semi-drying fatty acid oils, and more preferably substantially unsaturated fatty acids having from about 6 to 22 aliphatic carbon atoms with iodine numbers ranging up to about 400 or higher. Specifically, the unsaturated fatty acids may have iodine values over 100 and range up to 400 and may be employed either alone or in combination. Specific examples include, linseed oil fatty acid, linoleic acid, dehydrated castor oil acid, hempseed oil acid, cotton seed oil acid, poppy seed fatty acid, rapeseed fatty acid, and mixtures of one or more of these fatty acids with a rosin acid or the like, wherein the fatty acid is present in a major amount, e.g. in excess of about 50% by weight of the mixture. Other fatty acids may include, for example, myristic, palmitic, stearic linoleic and the fatty acids e.g. unsaturated acids derived from oils such as soybean fatty acids, safflower fatty acids, tall oil fatty acids, tung oil fatty acids, fish oil fatty acids and the like. Particularly, preferred are the fatty acids having conjugated double bonds such as eleostearic acid, etc. These fatty acids are considered to have conjugated unsaturation if the double bond and single bond alternate successively in the molecule. Thus, any drying oil fatty acid or mixtures of a drying and semi-drying oil fatty acid containing conjugated or nonconjugated olefinic linkages may be employed.

Thus, the fatty acids and preferably the unsaturated fatty acids, either natural or synthetic, are reacted with at least one epoxidized fatty acid ester and/or epoxidized fatty oil in amounts ranging from about 0.5 to 3.0 moles of the monocarboxylic fatty acid and preferably about 1.0 to 2.0 moles of the monocarboxylic fatty acid for each mole of the epoxidized fatty acid ester or epoxidized fatty oil. For purposes of this invention, one mole of the epoxidized fatty acid ester or epoxidized fatty acid oil has one atom of oxirane oxygen

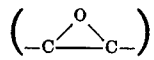

per molecule. Similarly, a mole of monocarboxylic fatty acid has one carboxylic-acid group (—COOH) which reacts with the epoxidized fatty ester or fatty oil to form the mixed ester.

The mixed esters obtained by the reaction of the fatty acids and the epoxidized fatty esters or fatty oils are subsequently modified by reaction with at least one aromatic vinyl monomer, e.g. styrene at temperatures of at least about 25° C, in the presence of a small but effective amount of a peroxide catalyst. The aromatic vinyl monomer is present in the reaction in an amount sufficient to obtain a modified-ester resin characterized as having from about 10 to 80% and preferably from about 40 to 60% by weight of the resin of said aromatic monomer.

The aromatic vinyl compounds that may be used for modifying the esters for purposes of this invention include compounds having the formula:

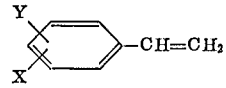

wherein X and Y are either the same or different and are selected from the class consisting of hydrogen, halogen and lower alkyl radicals having up to 8 aliphatic carbon atoms. Other vinyl aromatic compounds that may be used are characterized by the formula:

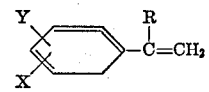

wherein X and Y are either the same or different and are selected from the class consisting of hydrogen, halogen and lower alkyl radicals having up to 8 aliphatic carbon atoms and R is an alkyl radical containing up to 4 aliphatic carbon atoms.

The various vinyl aromatic monomers include one or more compounds including, for example, styrene, methyl styrene, paramethyl styrene, orthoethyl styrene, paraethyl styrene, paradimethyl styrene, ortho-paradiethyl styrene, dibutyl styrene, paradimethyl styrene, orthopara-diethyl styrene, chloro-steyrene, orthomethyl-parachloro-styrene, orthoethyl-parachloro-styrene, methylpara-isopropyl styrene and various other alkyl aromatic compounds such as paramethyl-alphamethyl-styrene, alphaethyl-styrene, metachloro-alpha-styrene, parachloro-alphamethyl-styrene, paraisopropyl-alphamethyl-styrene, chloro-paramethyl-alphamethyl styrene, parapropyl-steyrene, 2,4-dimethyl styrene, 2,5-diethyl styrene, 3,5-dibutyl styrene, orthobromo styrene, 2,4-dichloro styrene, methoxy styrene, etc. Other aromatic vinyl monomers which may be employed include, for example, vinyl toluene, vinyl naphthalene and various substituted e.g. polar substituted aromatic vinyl monomers either alone or in combination in various proportions.

In reacting the aromatic vinyl monomer with the mixed esters e.g. derived from a fatty acid and one or more of the epoxidized-fatty esters and/or epoxidized-fatty oils, a catalytic amount, i.e. 0.001 to about 5.0% by weight and preferably from about 0.01 to 3.0% by weight of an organic peroxide catalyst is present. These peroxides are known organic compounds and include, for example, benzoyl peroxide, acetyl benzoyl peroxide, hydroxyheptyl peroxide, methylethyl ketone peroxide, cyclohexylhydro-peroxide, cyclohexanone peroxide, 2,4-dichlorobenzyl peroxide, cumenehydro-peroxide, butylhydro-peroxide, methyl amyl ketone peroxide, acetyl peroxide, lauryl peroxide, methyl-cyclohexylhydro-peroxide, parachlorobenzyl peroxide, ditertiary-butyl peroxide, paracetic acid, dialkylperphthalate, t-butyl perphthalic acid, tertiary-butyl peracetate, tertiary butyl perbenzoate and various mixtures thereof. Catalysts which are particularly useful include compounds which are generally classified as high temperature catalyst, e.g. operating at temperatures of above about 150° C. and includes, for example, compounds such as the alkyl-substituted diperoxides and alkyl-substituted hydroperoxides, e.g. the tertiaryalkyl-substituted diperoxides and tertiaryalkyl-substituted hydroperoxides such as 2,2-bis(tertiarybutyl peroxy) butane, tertiarybutyl hydroperoxide, ditertiarybutyl peroxide, tertiarybutyl-propyl peroxide, tertiarybutyl pentamethyl-ethyl peroxide and various combinations thereof.

In preparing the modified esters, the reaction is preferably carried out in the presence of an organic medium comprising a substantially inert organic solvent including, for example, the aromatic and aliphatic hydrocarbons, alcohols, ketones, esters, mixtures of aromatic hydrocarbons such as xylene, benzene, toluene, etc. the aliphatic ketones such as acetone, methyl ethyl ketone, cyclohexanone, xylol, naphtha, mineral spirits, etc. Thus any organic solvent or commercially available inert liquid commonly employed by the coating industry which is a mutual solvent or dispersant for the vinyl monomer as well as the ester may be used in various amounts.

In addition, a small but effective amount of a dibasic acid can be used in combination with the fatty acid and may be present in an amount ranging up to about 10% by weight and preferably in an amount ranging up to 5% e.g. 0 to 3.0% by weight of the monocarboxylic fatty acid, e.g. tall oil acid. The addition of a small but effective amount of a dibasic acid, e.g. phthalic acid, maleic acid etc. improves the physical characteristics of the fatty acid resin. This may be accomplished also by incorporating a small amount, e.g. up to about 5% by weight of a conjugated acid, e.g. conjugated linoleic, dehydrated ricinoleic, eleostearic acid, etc., which dimerize during the esterification process. Other dibasic acids that may be employed in combination with the fatty acids include, for example, adipic acid, maleic acid, phthalic acid, fumaric acid, itaconic acid and various dimer acids either alone or in combination in any proportion.

In preparing the modified esters of this invention, the vinyl monomer is added to the reaction at a temperature of at least about 25° C. and preferably at a temperature of at least about 80° C. and generally at temperatures ranging from about 80° C. to 300° C. and preferably at temperatures ranging from about 125° C. to 250° C. The resin products obtained from the reaction may be characterized as being extremely viscous or glassy solids that may be dissolved in a suitable solvent, e.g. naphtha, mineral spirits etc., which may or may not be present during the reaction.

The resin compositions of this invention are particularly useful in the manufacturing of varnishes, paints, enamels, etc. Moreover, because of their stability, the compositions may be stored, shipped and used when desired to make a particular coating composition. They may be used in a vehicle to prepare coatings sufficiently viscous for application to various surfaces by brush, roller coating or other conventional means.

The following illustrate the modified resin compositions and their use for preparing coatings.

EXAMPLE 1

A fatty acid adduct of an epoxidized fatty ester is prepared by adding approximately 1250 parts by weight of an epoxidized soybean oil, 2000 parts by weight of a 4% tall oil fatty acid and 60 parts by weight of xylene to a distilling flask fitted with an agitator, inert-gas tube, thermometer controller and a cold water condenser. The temperature of the reaction is brought up to about 238° C. over a period of about 2 hours and held at that temperature for approximately 6 hours during which time water from the reaction is removed. The product obtained is characterized as having an acid value of 16–18, a Gardner color of 6–7 and a Gardner-Holdt viscosity of V+.

EXAMPLE 2

An adduct is prepared by adding to a distilling flask fitted with an agitator, inert-gas tube, thermometer controller, and a cold water condenser, approximately 1300 parts by weight of an epoxidized linseed oil, 2500 parts by weight of a 4% rosin tall oil fatty acid and about 60 parts by weight of xylene. The reaction is heated to a temperature of about 238° C. in about 2 hours and held at that temperature for about 6 hours during which time water from the reaction is removed.

EXAMPLE 3

A fatty acid adduct is prepared by adding to a flask fitted with an agitator, inert-gas tube, thermometer controller and a cold water condenser approximately 1050 parts by weight of an epoxidized soyben oil (having about 7% by weight of oxirane oxygen), 400 parts by weight of an epoxidized 2-ethylhexyl tallate, 2000 parts by weight of a 4% rosin tall fatty acid and about 60 parts by weight of xylene. The reaction is brought to a temperature of about 238° C. over a period of about 2 hours and held at this temperature for about 6 hours during which time water is removed from the reactor.

EXAMPLE 4

A fatty acid adduct is prepared by adding to a distilling flask fitted with an agitator, inert-gas tube, thermometer controller and a cold water condenser approximately 1050 parts by weight of an epoxidized soybean oil, 35 parts by weight of adipic acid, 1700 parts by weight of a 4% rosin tall oil fatty acid and about 60 parts by weight of xylene. The reaction is heated to temperatures ranging up to about 238° C. over a period of about 2 hours and held at this temperature for approximately 2 hours during which time water is removed.

EXAMPLE 5

A modified ester resin is prepared by adding approximately 105 parts by weight of the fatty acid adduct of Example 1 and about 330 parts by weight of mineral spirits to a distilling flask fitted with an agitator, inert-gas tube, thermometer controller, reflux condenser and a dropping funnel. The reaction is heated to a temperature of about 152° C. and approximately 788 parts by weight of styrene and 788 parts by weight of vinyl toluene (premixed) together with about 15 parts by weight of ditertiary butyl peroxide are added to the reactor, in a dropwise manner, over a period of about 3 hours with temperatures ranging up to about 182° C. The reaction was gradually heated to about 20° C. for an additional hour until refluxing stopped. Naphtha was added to the reaction to obtain a product having a non-volatile content of about 60% by weight. The solution of resin had a viscosity of 14 poises and a Gardner color of 3–4.

EXAMPLE 6

An adduct of an epoxidized fatty ester is prepared by adding approximately 400 parts by weight of an epoxidized soya oil, about 800 parts by weight of a conjugated linoleic acid containing approximately 76% conjugation and 60 parts by weight of xylene to a distilling flask fitted with an agitator, inert gas tube, thermometer controller and a cold water condenser. The temperature of the reaction is brought up to about 238° C. over a period of about 2 hours and held for approximately 6 hours during which time water from the reaction is removed. The product is characterized as having an acid value of 7, a Gardner-Holdt viscosity of K–L and a non-volatile content of about 98%.

EXAMPLE 7

An adduct of an epoxidized fatty acid ester is prepared by adding approximately 1050 parts by weight of the epoxidized soya oil, 1000 parts by weight of pelargonic acid and approximately 200 parts by weight of xylene to a distilling flask as described in Example 1. The temperature of the reaction was brought up to about 240° C. over a period of about 2 hours and held for approximately 6 hours during which time water was removed. The product is a clear liquid having a Gardner-Holdt viscosity of L–M and an acid value of 6.

EXAMPLE 8

A modified ester resin is prepared by adding approximately 500 parts by weight of the adduct of Example 6 and about 330 parts by weight of mineral spirits to a distilling flask fitted with an agitator, inert gas tube, thermometer controller, reflux condenser and a dropping funnel. The reaction is heated to a temperature of about 152° C. and approximately 1000 parts by weight of styrene and 70 parts by weight of ditertiary butyl perbenzoate are added to the reactor, in a dropwise manner, over a period of about 3 hours at temperatures ranging up to about 180° C. The reaction is gradually heated to about 200° C. for an additional hour until reflux stopped. The product has a Gardner color of 6, a Gardner-Holdt viscosity of 125 poises, a non-volatile content of 98.5%.

EXAMPLE 9

A modified ester resin is prepared by adding approximately 700 parts by weight of the adduct of Example 7 to a distilling flask fitted with an agitator, inert gas tube, thermometer controller, reflux condenser and a dropping funnel. The reaction is heated to a temperature of about 152° C. and approximately 700 parts by weight of tertiary-butyl styrene and 14 parts by weight of ditertiary-butyl peroxide are added to the reactor, in a dropwise manner, over a period of about 3 hours at temperatures ranging up to about 180° C. The reaction is gradually heated to about 200° C. for an additional hour until reflux stopped. The product is a clear liquid having a Gardner color of 5, a Gardner-Holdt viscosity of 13–16 poises and a non-volatile content of 100%.

The following examples in Table I illustrate the various modified resins obtained from the fatty acid adduct of Example 1.

TABLE I

| Ex. No. | Parts by wt. Ex. 1 | Vinyl monomer | Parts by wt. | Solvent |
|---|---|---|---|---|
| 10 | 1,050 | Styrene and Vinyl toluene | 788 788 | Mineral spirits, naphtha, 20/80. |
| 11 | 1,050 | Styrene | 1,576 | Xylene, toluene and aliphatic laquer dil., 20/30/50. |
| 12 | 500 | Styrene and Alphamethyl styrene | 562 188 | Do. |
| 13 | 200 | Styrene Alphamethyl styrene and Vinyl toluene | 480 224 96 | Do. |
| 14 | 1,000 | Styrene | 1,500 | Do. |
| 15 | 1,000 | ___do___ | 1,500 | Do. |
| 16 | 1,000 | ___do___ | 1,500 | Do. |
| 17 | 1,000 | Styrene Butyl styrene and Alphamethyl styrene | 600 300 600 | Do. |

The characteristics of the product obtained from Examples 10 and 11 are illustrated in Table II.

TABLE II

| Example | NVM* | Viscosity | Color | VM-P** reducibility percent | Tack free time (Zapon) |
|---|---|---|---|---|---|
| 10 | 60 | 25 | 3–4 | 100 | 1 hour. |
| 11 | 60 | 20 | 3–4 | 50 | Do. |

*NVM is percent by weight of the non-volatile content.
**VM-P is varnish makers and painters naphtha (69 flash aliphatic naphtha KB is 33–42).

A floor sealer composition is prepared from the following composition:

EXAMPLE A

|  | Parts by weight | Parts by volume |
|---|---|---|
| Composition of Example 5 | 430 | 56 |
| Zinc stearate | 26 | 2.8 |
| Mineral spirits and naphtha | 225 | 34.6 |
| 6% manganese naphthenate | 2 | 0.25 |

The composition of Example A was found to be tack free in about twenty minutes and could be sanded in about an hour.

A clear paper coating or label varnish is prepared from the following composition:

EXAMPLE B

|  | Parts by weight | Parts by volume |
|---|---|---|
| Composition of Example 11 | 375 | 50 |
| Toluene | 375 | 51.7 |
| 6% cobalt naphthenate | 1.1 | 0.12 |
| D-C paint additive #11* | 1.1 | 0.10 |

*Additive #11 is a Dow Corning silicone flow agent.

This composition is block free in 10–20 seconds at 300° F., and non-yellowing over bleached paper stock.

The modified ester compositions of this invention may be used on a variety of surfaces as a coating having improved characteristics particularly with respect to hardness, flexibility, adhesion, durability and resistance to abrasion, detergents, chemicals and the like. Moreover, the modified fatty esters may be utilized to prepare coatings which may be applied by conventional means, e.g. spraying, brushing, dipping, flow or roller coaters, etc., to obtain unblemished surfaces. The coating compositions may be used either in the clear or pigmented form with one or more modifiers such as curing accelerators, surface active agents, plasticizers and various other known additives generally used in coating compositions. The pigments and solvents normally employed in the compositions of this invention are of the type generally used in organic paints, varnishes, enamels, lacquers and, therefore, may be used in various amounts depending upon the ultimate use of the coated article. For example, the pigments may include, metal oxide, hydroxides, chromates, silicates, sulfides, carbon black, dyestuffs, metalflakes, etc.

While this invention is described by a number of specific embodiments, it is obvious there are other variations and modifications which can be made without departing from the spirit and scope of the invention as set forth in the appended claims.

What is claimed is:

1. A resin composition prepared by reacting (a) from about 0.5 to 3.0 moles of at least one fatty acid having up to 36 aliphatic carbon atoms with (b) about 1.0 mole of at least one epoxidized fatty-acid ester or epoxidized fatty oil having an oxirane-oxygen content ranging from about 1% to 12% by weight to obtain a mixed ester and subsequently reacting said mixed ester in the presence of a peroxide catalyst with (c) at least one aromatic vinyl monomer to obtain a modified mixed ester containing from about 10% to 80% by weight of the aromatic vinyl monomer; said aromatic vinyl monomer having the formula:

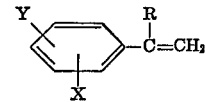

wherein X and Y are either the same or different and are selected from the class consisting of hydrogen, halogen and lower alkyl radicals having up to 8 aliphatic carbon atoms and R is hydrogen or an alkyl radical having up to 4 aliphatic carbon atoms.

2. The composition of claim 1 further characterized in that the fatty acid is an unsaturated fatty acid and is present in an amount ranging from about 1.0 to 2.0 moles for each mole of the epoxidized fatty-acid ester or epoxidized fatty oil.

3. The composition of claim 1 further characterized in that the fatty acid is a conjugated unsaturated fatty acid.

4. The composition of claim 1 further characterized in that the fatty acid is a conjugated unsaturated fatty acid having up to 36 carbon atoms.

5. The composition of claim 1 further characterized in that the fatty acid is a drying or semi-drying unsaturated fatty acid derived from natural fats and oils.

6. The composition of claim 1 further characterized in that the fatty acid is a tall oil fatty acid.

7. The composition of claim 1 further characterized in that the fatty acid is a soya fatty acid.

8. The composition of claim 1 further characterized in that the fatty acid is castor oil fatty acid.

9. The composition of claim 1 further characterized in that the fatty acid is linoleic acid.

10. The composition of claim 1 further characterized in that the fatty acid is oleic acid.

11. The composition of claim 1 further characterized in that the epoxidized-fatty acid ester has an oxirane oxygen content ranging from about 2 to 10% by weight.

12. The composition of claim 1 further characterized in that the epoxidized-fatty oil has an oxirane oxygen content ranging from about 2 to 10% by weight.

13. The composition of claim 1 further characterized in that the catalyst is an organic peroxide present in an amount ranging from about 0.001 to 5.0 by weight of the ester.

14. The composition of claim 1 further characterized in that the aromatic monomer is styrene.

15. The composition of claim 1 further characterized in that the aromatic monomer is an alkyl-substituted styrene and is present in the modified ester in an amount ranging from about 20% to 60% by weight.

16. The composition of claim 1 further characterized in that at least about 1.0 mole of the fatty acid is present for each mole of oxirane oxygen present in the epoxidized-fatty acid ester or epoxidized-fatty oils.

17. The composition of claim 1 further characterized in that the ester of the epoxidized-fatty acid ester is derived from an unsaturated fatty acid having up to 36 aliphatic carbon atoms and an aliphatic polyhydric alcohol.

18. The composition of claim 1 further characterized in that the epoxidized fatty oil is an epoxidized linseed oil.

19. The composition of claim 1 further characterized in that the epoxidized fatty oil is an epoxidized tung oil.

20. The composition of claim 1 further characterized in that the epoxidized fatty oil is an epoxidized soybean oil having an oxirane oxygen content ranging from about 2 to 10% by weight.

21. The composition of claim 1 further characterized in that the epoxidized-fatty acid ester is derived from an unsaturation-conjugated fatty acid and an aliphatic alcohol.

22. The composition of claim 1 further characterized in that the epoxidized fatty oil is derived from an unsaturated fatty oil.

23. The composition of claim 13 further characterized in that the peroxide catalyst is an alkyl peroxide.

24. The composition of claim 16 further characterized in that the fatty acid is a conjugated unsaturated fatty acid, having from 6 to 22 carbon atoms.

25. The composition of claim 23 further characterized in that the alkyl peroxide is dibutyl peroxide.

26. A process for preparing a resin composition which comprises reacting in an organic medium (a) from about 0.5 to 3.0 moles of at least one fatty acid having up to 36 aliphatic carbon atoms with (b) about 1.0 mole of at least one epoxidized fatty-acid ester or epoxidized fatty oil having an oxirane oxygen content ranging from about 1% to 12% by weight at a temperature ranging from about 25° C. to 300° C. to obtain a mixed ester and subsequently reacting said mixed ester in the presence of a peroxide catalyst at a temperature of at least about 25° C. with (c) at least one aromatic vinyl monomer to obtain a modified mixed ester containing from about 10% to 80% by weight of the aromatic vinyl monomer; said aromatic vinyl monomer having the formula:

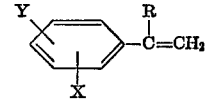

wherein X and Y are either the same or different and are selected from the class consisting of hydrogen, halogen and lower alkyl radicals having up to 8 aliphatic carbon atoms and R is hydrogen or an alkyl radical containing up to 4 aliphatic carbon atoms.

27. The process of claim 26 further characterized in that the fatty acid is an unsaturated fatty acid and is present in an amount ranging from about 1.0 to 2.0 moles for each mole of the epoxidized fatty-acid ester or epoxidized fatty oil.

References Cited

UNITED STATES PATENTS

| | | | |
|---|---|---|---|
| 2,999,827 | 9/1961 | McGray et al. | 260—23 EP |
| 3,030,322 | 4/1962 | Lombardi et al. | 260—23 EP |
| 3,674,545 | 7/1972 | Strolle | 260—836 |
| 3,574,147 | 4/1971 | Giessler et al. | 260—836 |

FOREIGN PATENTS

| | | | |
|---|---|---|---|
| 551,429 | 1/1958 | Canada | 260—23 EP |

DONALD E. CZAJA, Primary Examiner

W. E. PARKER, Assistant Examiner

U.S. Cl. X.R.

260—831, 886